Sept. 22, 1964
M. E. LIPPMAN
3,150,343
POTENTIOMETER
Filed Nov. 27, 1961
2 Sheets-Sheet 1
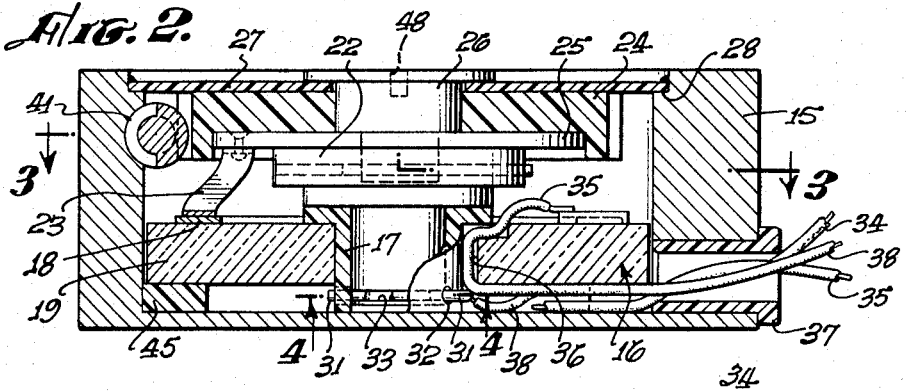
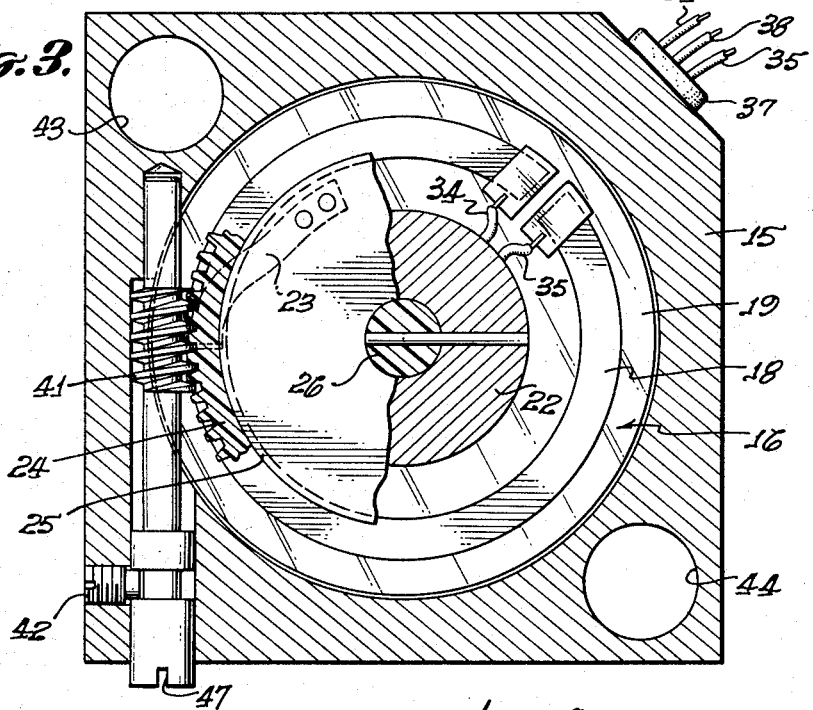
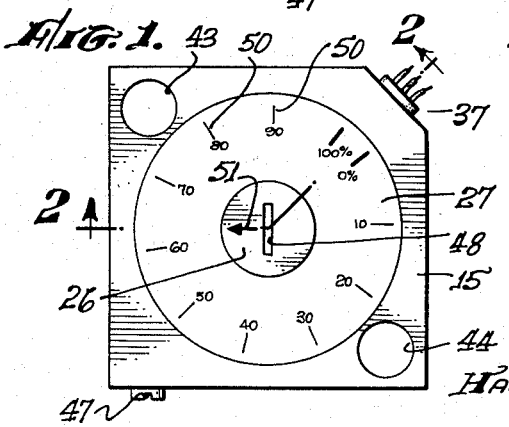
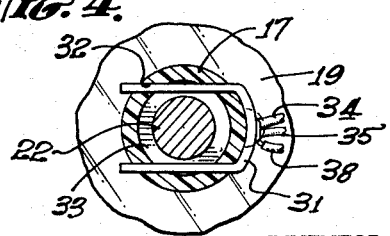
INVENTOR.
MYRON E. LIPPMAN,
BY HIS ATTORNEYS.
HARRIS, KIECH, RUSSELL & KERN.

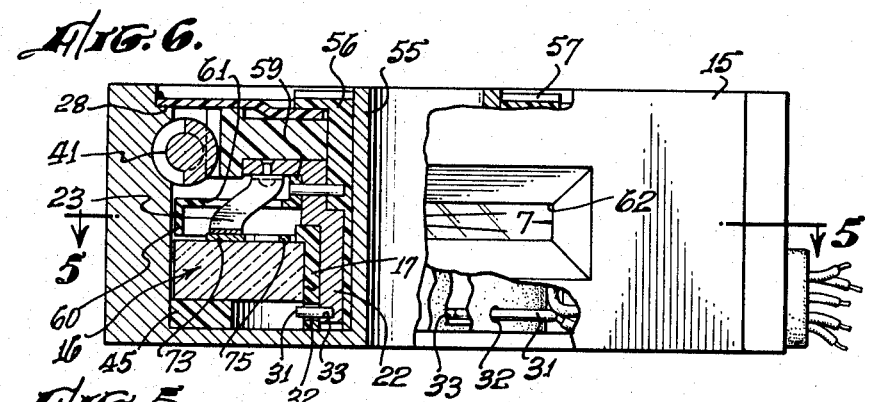

ated Sept. 22, 1964

3,150,343
POTENTIOMETER
Myron E. Lippman, Northridge, Calif., assignor to Intellux Inc., Santa Barbara, Calif., a corporation of California
Filed Nov. 27, 1961, Ser. No. 154,993
14 Claims. (Cl. 338—174)

This invention relates to potentiometers or adjustable resistors and particularly to potentiometers of the type now referred to as subminiature. Subminiature potentiometers are now being manufactured in the size range of ½ x ½ x ⅛ inch and smaller with the instrument being sealed in a case for both mechanical and environmental protection.

Many problems are encountered in the manufacture, assembly and testing of potentiometers of this type and it is an object of the present invention to provide a new and improved potentiometer which is durable, rugged, easily assembled and tested, and one which has new and novel operating characteristics.

A particular object of the invention is to provide a potentiometer having dual adjustment, including a fine adjustment with a reduction ratio such as is obtained with the conventional worm and gear, and a coarse adjustment in the form of a direct drive. A further object is to provide such an instrument in which the fine adjustment is achieved with a friction drive to the contact arm and the coarse adjustment is obtained with a direct drive to the contact arm. Another object is to provide a new and improved flexible shaft drive for use in place of the conventional worm and gear in the fine adjustment.

It is a particular object of the invention to provide a new and improved potentiometer of the subminiature type which is particularly adapted for use with film-type resistance elements. A further object is to provide such an instrument which includes a variable resistor and one or more fixed resistors in a single film to provide resistance networks with common characteristics.

It is an object of the invention to provide a potentiometer which may be fully assembled and tested externally of the mounting case so that only perfect units are sealed in the case. In conventional subminiature-type potentiometers, the case serves as a support for certain elements of the instrument so that the complete unit is not available for testing until all of the components have been assembled and sealed into the case. This makes rework difficult and usually results in scrapping of the entire unit if performance specifications are not met. A further object is to provide a subminiature-type potentiometer having a central mounting opening permitting stacking of a plurality of the units on a single mounting stud or screw.

It is an object of the invention to provide a subminiature-type potentiometer having an indicator of the potentiometer setting which is visible from the exterior. A further object is to provide such an instrument in which the indicator is visible from the side and from the top of the unit. Another object is to provide such indicators in the dual-adjustment potentiometer.

The invention also comprises novel details of construction and novel combinations and arrangements of parts, which will more fully appear in the course of the following description. The drawings merely show and the description merely describes preferred embodiments of the present invention which are given by way of illustration or example.

In the drawings:

FIG. 1 is a top view of a preferred embodiment of the invention;

FIG. 2 is an enlarged sectional view taken along the line 2—2 of FIG. 1;

FIG. 3 is a sectional view taken along the line 3—3 of FIG. 2;

FIG. 4 is a partial sectional view taken along the line 4—4 of FIG. 2;

FIG. 5 is a sectional view similar to that of FIG. 3 of an alternative embodiment of the invention;

FIG. 6 is an enlarged sectional view taken along the line 6—6 of FIG. 5;

FIG. 7 is a partial sectional view taken along the line 7—7 of FIG. 5;

FIG. 8 is a top view partly in section, of another alternative embodiment of the invention; and FIG. 9 is an enlarged partial sectional view taken along the line 9—9 of FIG. 8.

A potentiometer of the type usually referred to as a square trimming potentiometer is illustrated in FIGS. 1–4. The unit is cointained in a case 15 about ½ x ½ x ⅛ inch in size. The case is preferably made of a metal such as aluminum for improved heat conduction. A resistance element 16 has an electrically nonconducting bushing 17 mounted therein. Any type of resistance element, including wire wound, composition, and films, may be used in the potentiometer. In the preferred form shown herein, a film 18 of resistance material is deposited on a glass substrate or base 19.

A rotor 22 of electrical conducting material such as copper or aluminum, is mounted in the bushing 17 for rotation therein. A contact arm 23 of a resilient electrically conducting material is fixed to the rotor 22, as by riveting, and has a free end for engaging the resistance element. A drive member in the form of a gear 24 is mounted on a flange 25 of the rotor. Another drive member in the form of a stepped shaft 26 is fixed to the rotor as by pinning, with the shaft 26 passing through an opening in the gear 24 and through an opening in a cover plate 27 which is adapted to rest in a shoulder 28 of the case 15.

A brush or slip ring contact 31 is carried in the lower end of the bushing 17 for engaging a shoulder of the rotor 22. In the preferred form shown in FIGS. 2 and 4, the contact is a U-shaped piece of electrically conducting wire passing through slots or openings 32 in the bushing and engaging a shoulder 33 of a groove in the rotor 22. Leads 34, 35 are connected to the terminals of the resistance element 16 and are directed out of the case through a groove 36 in the resistance element base 19 and through a grommet 37 in the case. Another lead 38 is fixed to the contact 31 and also passes out through the grommet 37.

A worm 41 is journaled in the case 15 for driving the gear 24 an dis fixed in place by a pin or a set screw 42. Openings 43, 44 are provided in the case for mounting purposes and a corner of the case is cut off to provide clearance for the grommet 37 and the leads extending therefrom.

The potentiometer is assembled by mounting the gear 24 on the flange 25 of the rotor 22. The cover plate 27 is positioned on top of the gear and the shaft 26 is inserted into the rotor and pinned in place. The cover plate 27 is free to rotate on the shaft 26. The gear 24 frictionally engages the rotor so that the rotor can be driven by the worm and gear. However, the frictional engagement permits the rotor to be driven by the shaft 26 while the gear is locked in place with the worm, the rotor moving relative to the gear.

The resistance element 16 is mounted on the bushing 17. The rotor is inserted into the bushing and the contact 31 is slid into position for retaining the rotor in the resistance element. The electrical portion of the potentiometer is now fully assembled and the unit is ready for final electrical testing.

After testing, the electrical unit is inserted into the case 15 by first threading the leads through the grommet and then placing the unit into the cavity of the case. A spacer 45 may be positioned in the bottom of the case with the resistance element resting on the spacer. The cover plate 27 may be sealed in the shoulder 28 with a suitable cement. The space between the resistance element and the bottom of the case and the space within the grommet may be filled by a sealing material inserted through the grommet. Typical suitable sealing materials are silicone rubber cement or an epoxy resin. This sealing material aids in holding the element within the case and also locks the leads in place as well as excluding moisture from the unit. The cavity between the gear 24 and the resistance element 16 may be filled with a fluid such as a silicone grease providing a lubricant and a heat conductive medium within the case. The grease can be inserted through the opening for the worm 41, after which the worm is inserted and fixed in place by the screw 42.

A slot 47 is provided in the head of the worm shaft 41 for fine adjustment of the potentiometer setting. The worm drives the gear 24 with a reduction ratio typically in the order of forty-five to one. The gear 24 drives the rotor 22 relative to the resistance element which is fixed in the case by the cement or other sealant. Another slot 48 is provided in the shaft 26 for coarse adjustment of the potentiometer setting. The shaft 26 is pinned to the rotor and provides a direct or one-to-one drive ratio. Engagement with the worm prevents rotation of the gear 24 when the rotor is being driven directly from the shaft 26, the rotor slipping relative to the gear. The direct drive permits rapid setting of the potentiometer while the worm drive permits a slower and more precise setting.

An indication of the potentiometer setting may be provided at the cover plate 27. A plurality of markers 50 may be formed on the plate, with the markers corresponding to the characteristic of the resistance element. In the embodiment shown herein, the resistance element is linear and eleven markers are equally spaced to indicate the ten percent divisions along the resistance element, with the zero and one hundred markers being aligned with the terminals of the resistance element. Another marker such as an arrow 51 may be provided on the shaft 26 in alignment with the point or edge on the contact arm which contacts the resistance element.

The potentiometer may be mounted in the conventional manner with screws through the openings 43, 44. Alternatively, other means for mounting may be used, such as clamping, cementing, and encapsulating. It should be noted that the two adjustment mechanisms are actuated from two different surfaces of the unit which eliminates a number of restrictions on the mounting of the unit. The engagement of the worm and gear and the frictional engagement of the gear with the rotor provides a frictional lock on the potentiometer setting materially improving the stability of the unit under shock and vibration while at the same time permitting both coarse and fine adjustment with ease.

The structure of the rotor permits complete assembly and testing of the unit prior to placing the unit in the case. Also, the rotor structure requires only two sliding contacts, at the surface of the resistance film and at the slip ring, thereby minimizing possibilities of electrical noise.

An alternative embodiment of the potentiometer incorporating a number of different features is shown in FIGS. 5, 6 and 7. Elements identical to those of the embodiment of FIGS. 1–4 are identified by the same reference numerals.

A hollow central boss 55 projects upward from the bottom of the case 15 through the center of the opening in the case. The rotor 22 is journaled in the bushing 17 as in the first embodiment. A shaft 56 corresponding to the shaft 26 of the first embodiment, is inserted in and pinned to the rotor 12. The shaft 56 is rotatably mounted on the boss 55 with the upper surface of the shaft slightly below that of the boss.

The potentiometer of FIGS. 5 and 6 may be mounted on a single central screw or stud passing through the opening in the boss 55. This unit has the dual adjustment feature as in the earlier embodiment, with the worm 41 providing the fine adjustment and the shaft 56 the coarse adjustment. A slot 57 may be provided in the head of the shaft for receiving a screw driver or other suitable tool. An indicator wheel 59 may be carried on the rotor 12, the wheel having a peripheral flange or rim 60 disposed adjacent the edge of the cavity of the case. In the embodiment of FIG. 6, the wheel 59 is pinned to the rotor 12 at the same time the shaft 56 is pinned in place. An opening 61 may be provided in the wheel permitting the contact arm 23 to pass therethrough. A series of markers, such as the numerals zero through ten, may be positioned around the rim 60 and an opening 62 is provided in a side wall of the case 15 for external viewing of the markers. Ordinarily, the opening 62 will be provided in the same wall as the head of the worm shaft and will be covered by a transparent panel 63. This arrangement provides for adjustment of the unit from two surfaces and also for visual inspection of the setting of the unit from the two surfaces.

A circuit comprising a plurality of interconnected resistors with one of the resistors being adjustable, may be achieved with the potentiometer of the present invention. A typical arrangement consisting of three resistors connected in series with the center resistor being adjustable and useable either as a variable resistance of a voltage divider, is shown in FIG. 5. The film 18 of resistance material is deposited on the base 19 in the pattern of FIG. 5. Starting at terminal 70, the first resistor comprises a relatively narrow serpentine portion 71 running to terminal 72. The second resistor comprises a relatively wide arcuate portion 73 running from the terminal 72 to terminal 74 and disposed for traverse by the contact arm 23. The third resistor comprises another relatively narrow serpentine section 75 running from the terminal 74 to terminal 76. Ordinarily the resistance film forming the resistors will be homogeneous and hence the magnitude of resistance between terminals will be a function of the length and cross section of the film disposed between the terminals.

The resistors of the circuit shown in FIG. 5 will have identical temperature coefficients of resistance and will be exposed to the same environmental conditions. This result is of extreme value in many circuits which incorporate both fixed and variable resistors and require consistent characteristics therein. It will be readily realized that various arrangements of resistors can be obtained following the structure shown in FIG. 5, with different series and parallel combinations being readily achievable.

The circuit arrangement of the instrument of FIG. 5 may also be used to provide a potentiometer with an expanded scale for improved resolution over a portion of the total resistance value of the potentiometer. For example, the resistors may be formed to give a total resistance between terminals 70, 76 of 100,000 ohms, with the resistor sections 71 and 75 having a resistance of 40,000 ohms each and the section 73 a resistance of 20,000 ohms. Then one revolution of the potentiometer provides adjustment over a 20,000 ohm range, providing an improved resolution over a similar potentiometer having adjustment over the entire 100,000 ohm range.

Various of the known techniques may be used for making the resistance film. Typical are those described in U.S. Patents Nos. 2,693,023; 2,796,504 and 2,849,583.

An alternative structure for the fine adjustment drive is shown in FIGS. 8 and 9. A drive member 80 is used in place of the gear 24, the drive member being a friction fit on the flange 25 of the rotor 22. A groove 81 is provided in the periphery of the drive member 80, the groove being circular in cross section and preferably greater than 180°. A drive shaft 82 comprising a rigid portion 83 journaled in the case 15 and a flexible portion 84 riding in the groove 81, provides for the fine adjustment of the potentiometer. The flexible portion may be a helically wound wire fixed to the rigid portion 83 at a flange 85. Rotation of the drive shaft 82 provides rotation of the drive member 80 through frictional engagement of the helical winding in the groove, providing for adjustment of the potentiometer in the same manner as the worm and gear of the earlier embodiments.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In a potentiometer, the combination of:
   a potentiometer case;
   an arcuate resistance element for mounting in said case and including a centrally disposed bushing;
   a rotor of electrically conductive material journaled in said bushing, said rotor including a contact arm resiliently engaging said resistance element;
   a first drive member carried on and frictionally engaging said rotor for driving the contact arm;
   a second drive member fixed to asid rotor for driving the contact arm;
   a cover plate for closing the potentiometer case, with said plate retained between and rotatable relative to said first and second drive members for supporting said rotor on said cover plate, with said second drive member projecting above said plate for external manipulation;
   shaft means carried in said case and engaging said first drive member adjacent the periphery thereof for rotating said first drive member;
   and a brush contact retained in an opening in said bushing and engaging said rotor for electrical connection to said rotor and for retaining said bushing and resistance element on said rotor.

2. In a potentiometer, the combination of:
   an arcuate resistance element for mounting in a potentiometer case and including a centrally disposed bushing;
   a rotor of electrically conductive material journaled in said bushing, said rotor including a contact arm resiliently engaging said resistance element;
   a first drive member frictionally engaging said rotor for driving the contact arm;
   a second drive member fixed to said rotor for driving the contact arm;
   a cover plate for closing the potentiometer case, with said plate retained between and rotatable relative to said first and second drive members for supporting said rotor on said cover plate;
   and a brush contact retained in an opening in said bushing and engaging a shoulder of said rotor for electrical connection to said rotor and for retaining said bushing and resistance element on said rotor.

3. In a potentiometer, the combination of:
   a potentiometer case;
   an arcuate resistance element for mounting in said case and including a centrally disposed bushing;
   a rotor of electrically conductive material journaled in said bushing, said rotor including a contact arm resiliently engaging said resistance element;
   a first drive member carried on and frictionally engaging said rotor for driving the contact arm;
   a second drive member fixed to said rotor for driving the contact arm;
   a cover plate for closing the potentiometer case carried on said second drive member for supporting said rotor on said cover plate, with said second drive member accessible for external manipulation for coarse adjustment of the potentiometer setting;
   shaft means carried in said case and engaging said first drive member adjacent the periphery thereof for rotating said first drive member for fine adjustment of the potentiometer setting;
   and a brush contact retained in an opening in said bushing and engaging said rotor for electrical connection to said rotor and for retaining said bushing and resistance element on said rotor.

4. In a potentiometer, the combination of:
   a potentiometer case having an inspection opening in a side wall thereof;
   an arcuate resistance element for mounting in said case and including a centrally disposed bushing;
   a rotor of electrically conductive material journaled in said bushing, said rotor including a contact arm resiliently engaging said resistance element and an arm position indicator disposed for viewing through said case opening;
   a first drive member frictionally engaging said rotor for driving the contact arm;
   a second drive member fixed to said rotor for driving the contact arm;
   a cover plate for closing the potentiometer case carried on said second drive member for supporting said rotor on said cover plate;
   shaft means carried in said case and engaging said first drive member adjacent the periphery thereof for rotating said first drive member;
   and a brush contact retained in an opening in said bushing and engaging said rotor for electrical connection to said rotor and for retaining said bushing and resistance element on said rotor.

5. In a potentiometer, the combination of:
   a potentiometer case having an inspection opening in a side wall thereof;
   an arcuate resistance element for mounting in said case and including a centrally disposed bushing;
   a rotor of electrically conductive material journaled in said bushing, said rotor including a contact arm resiliently engaging said resistance element and a first arm position indicator disposed for viewing through said case opening;
   a first drive member carried on and frictionally engaging said rotor for driving the contact arm;
   a second drive member fixed to said rotor for driving the contact arm;
   a cover plate for closing the potentiometer case, with said plate retained between and rotatable relative to said first and second drive members for supporting said rotor on said cover plate, with said second drive member projecting above said plate for external manipulation and having a second arm position indicator;
   shaft means carried in said case and engaging said first drive member adjacent the periphery thereof for rotating said first drive member;
   and a brush contact retained in an opening in said bushing and engaging said rotor for electrical connection to said rotor and for retaining said bushing and resistance element on said rotor.

6. In a potentiometer, the combination of:
a potentiometer case having a tubular central shaft projecting from the bottom thereof;
an arcuate resistance element for mounting in said case and including a centrally disposed bushing;
a rotor of electrically conductive material journaled in said bushing, said rotor including a contact arm resiliently engaging said resistance element;
a first drive member engaging said rotor for driving the contact arm;
a second drive member fixed to said rotor for driving the contact arm, with said rotor and second drive member journaled on said case shaft;
a cover plate for closing the potentiometer case carried on said second drive member for supporting said rotor on said cover plate, with said case shaft projecting above said drive members;
drive shaft means carried in said case and engaging said first drive member adjacent the periphery thereof for rotating said first drive member;
and a brush contact retained in an opening in said bushing and engaging said rotor for electrical connection to said rotor and for retaining said bushing and resistance element on said rotor.

7. In a potentiometer, the combination of:
a potentiometer case;
an arcuate resistance element for mounting in said case and including a centrally disposed bushing;
a rotor of electrically conductive material journaled in said bushing, said rotor including a contact arm resiliently engaging said resistance element;
a first drive member carried on and frictionally engaging said rotor for driving the contact arm;
a second drive member fixed to said rotor for driving the contact arm;
a cover plate for closing the potentiometer case, with said plate retained between and rotatable relative to said first and second drive members for supporting said rotor on said cover plate, with said second drive member projecting above said plate for external manipulation;
shaft means carried in said case and engaging said first drive member adjacent the periphery thereof for rotating said first drive member by rotation of said shaft means and for locking said first drive member relative to said case when said rotor is driven by said second drive member with said rotor slipping relative to said first drive member;
and a brush contact retained in an opening in said bushing and enagaging said rotor for electrical connection to said rotor and for retaining said bushing and resistance element on said rotor.

8. In a potentiometer, the combination of:
an arcuate resistance element for mounting in a potentiometer case and including a centrally disposed bushing;
a rotor of electrically conductive material journaled in said bushing, said rotor including a contact arm resiliently engaging said resistance element;
drive means for rotating said rotor to move said contact arm along said resistance element;
and a U-shaped resilient contact for electrical connection to said rotor and for retaining said bushing and resistance element on said rotor, with the arms of said contact disposed in openings in said bushing and engaging a shoulder of said rotor.

9. In a potentiometer, the combination of:
a potentiometer case;
a resistance element for mounting in said case and having a centrally disposed bushing, said resistance element comprising a film of resistance material on a substrate, said film including a pair of terminals and a plurality of resistor sections interconnected between said terminals, with at least one of said sections being relatively wide and disposed along an arcuate path for traverse by a contact arm, and with at least one of said sections being relatively narrow and disposed out of said path;
a rotor of electrically conductive material journaled in said bushing, said rotor including a contact arm resiliently engaging said resistance element;
a first drive member engaging said rotor for driving the contact arm;
a second drive member fixed to said rotor for driving the contact arm;
a cover plate for closing the potentiometer case carried on said second drive member for supporting said rotor on said cover plate;
shaft means carried in said case and engaging said first drive member adjacent the periphery thereof for rotating said first drive member;
and a brush contact retained in an opening in said bushing and engaging said rotor for electrical connection to said rotor and for retaining said bushing and resistance element on said rotor.

10. In a potentiometer, the combination of:
a case;
an arcuate resistance element for mounting in said case and including a centrally disposed shaft bushing in the plane of the resistance element;
a rotor journaled in said shaft bushing and including a contact arm resiliently engaging said resistance element and an annular conductive surface electrically connected to said contact arm;
a first drive member engaging said rotor for driving the contact arm, said first drive member including means for rotation thereof externally of said case;
said rotor including a second drive member for driving the contact arm, said second drive member including means for rotation thereof externally of said case independently of said first drive member; and
a brush contact fixed relative to said case and engaging said rotor annular surface for electrical circuit connection to said rotor.

11. In a potentiometer, the combination of:
a case;
an arcuate resistance element for mounting in said case and including a centrally disposed shaft opening;
a rotor journaled in said shaft opening and including a contact arm resiliently engaging said resistance element and an annular conductive surface electrically connected to said contact arm;
a first drive member engaging said rotor for driving the contact arm, said first drive member including means for rotation thereof externally of said case;
said rotor including a second drive member for driving the contact arm, said second drive member including means for rotation thereof externally of said case;
said rotor including a second drive member for driving the contact arm, said second drive member including means for rotation thereof externally of said case independently of said first drive member;
a brush contact fixed relative to said case and engaging said rotor annular surface for electrical circuit connection to said rotor; and
a cover plate carried on said rotor for closing said case with said rotor rotatable relative to said cover plate.

12. A potentiometer as defined in claim 1 in which said first drive member has a peripheral groove and in which said shaft means includes a rigid portion journaled in said case and a helical flexible portion wrapped around and engaging said drive member groove in driving relation.

13. A potentiometer as defined in claim 1 in which said first drive member and shaft means comprises a drive shaft carried in the case and engaging said rotor for moving said contact arm along said resistance element, said drive shaft including a rigid portion journaled in said case and a helically wound flexible portion contained in a shaft retaining groove of said rotor, whereby rotation of said drive shaft moves said rotor along said shaft.

14. A potentiometer as defined in claim 1 in which said resistance element comprises a film of resistance material on a substrate, said film including a pair of terminals and a plurality of resistor sections interconnected between said terminals, with at least one of said sections disposed along an arcuate path for traverse by a contact arm, and with at least one of said sections disposed out of said path.

References Cited in the file of this patent
UNITED STATES PATENTS

| | | |
|---|---|---|
| 586,864 | Pieper et al. | July 20, 1897 |
| 2,880,293 | Blanco | Mar. 31, 1959 |
| 2,887,554 | Smith et al. | May 19, 1959 |

UNITED STATES PATENT OFFICE
CERTIFICATE OF CORRECTION

Patent No. 3,150,343                      September 22, 1964

Myron E. Lippman

It is hereby certified that error appears in the above numbered patent requiring correction and that the said Letters Patent should read as corrected below.

Column 1, line 26, strike out "pro-"; column 2, line 24, for "cointained" read -- contained --; line 58, for "an dis" read -- and is --; column 4, line 45, for "of" read -- or --; column 5, line 41, for "asid" read -- said --; column 8, lines 54 to 57, strike out "said rotor including a second driv member for driving the contact arm, said second drive member including means for rotation thereof externally of said case;

Signed and sealed this 30th day of March 1965.

(SEAL)
Attest:

ERNEST W. SWIDER
Attesting Officer

EDWARD J. BRENNER
Commissioner of Patents